United States Patent [19]
Goodwater et al.

[11] Patent Number: 5,444,911
[45] Date of Patent: Aug. 29, 1995

[54] GAS TURBINE ENGINE VANE ASSEMBLY REPAIR

[75] Inventors: Frank J. Goodwater, Carson; Lang D. Huynh; David S. Kang, both of Carson City, all of Nev.

[73] Assignee: Chromalloy Gas Turbine Corporation, San Antonio, Tex.

[21] Appl. No.: 238,317

[22] Filed: May 5, 1994

[51] Int. Cl.⁶ .............................................. B23P 15/00
[52] U.S. Cl. .................................. 29/889.7; 29/889.1
[58] Field of Search ................ 29/889, 889.1, 426.5, 29/426.1

[56] References Cited

U.S. PATENT DOCUMENTS

| | | | |
|---|---|---|---|
| 3,802,046 | 4/1974 | Wachtell et al. | 29/156.8 |
| 3,909,157 | 9/1975 | Wachtell et al. | 415/217 |
| 4,176,433 | 12/1979 | Lee et al. | 29/156.8 |
| 4,305,697 | 12/1981 | Cohen et al. | 415/217 |
| 4,527,410 | 7/1985 | MacNitt et al. | 72/306 |
| 4,590,653 | 5/1986 | Ades et al. | 29/156.8 |

Primary Examiner—Irene Cuda
Attorney, Agent, or Firm—Mitchell D. Bittman

[57] ABSTRACT

A process and apparatus are provided for separating components of a brazed vane assembly by preheating the assembly to a temperature below the solidus of the base metal of the vane assembly and above the liquidus of the braze, then maintaining such temperature while separating the airfoil from the platform by pulling-/pushing the airfoil and platform apart.

14 Claims, 4 Drawing Sheets

GAS TURBINE ENGINE VANE ASSEMBLY REPAIR

BACKGROUND OF THE INVENTION

This invention relates to gas turbine engine vane assemblies and, more particularly, to an improved method and apparatus for repairing a brazed vane assembly.

In a gas turbine engine of the type to which the present invention is directly applicable, working medium gases are burned in a combustion section and are expanded through a turbine section. Disposed within the turbine section are one or more rows of stator vanes which are adapted to direct the working medium gases in vane assemblies to a preferred angle of approach into a downstream row of rotor blades.

The vanes of the turbine have a limited life and are among the most susceptible of gas turbine engine components to damage. The medium gases directed across the vanes are extremely hot and contain corrosive constituents. For example, the initial row of stator vanes in a modern turbine is exposed to gases having temperatures well in excess of two thousand degrees Fahrenheit (2000° F.). Corrosive constituents contained within the medium gases include unreacted oxygen and oxides of sulfur. Violent energy reactions upstream of the stator vanes make it nearly impossible to control the homogeneity of the medium gases approaching the vanes. Accordingly, the vanes do not wear evenly and individual vanes are likely to need repair or replacement before the entire set.

For ease of installation of the vanes and for aerodynamic performance considerations, it is conventional practice to form a row of stator vanes from vane assemblies comprising a plurality of individual airfoils each attached to an inner and outer platform. The vane assemblies are disposed in end-to-end relationship circumferentially around the working medium flow path. Paired airfoils such as those illustrated in FIG. 3 are commonly employed although each assembly may also comprise three or more airfoils.

Such vane assemblies are complex in design and are relatively costly to manufacture. Therefore, it is desirable to repair, rather than to replace such vane assemblies which may have been worn or damaged during gas turbine engine operation. It has been recognized that a substantial portion of such wear or damage occurs to the airfoils of the vane assembly, e.g. to the leading or trailing edge of the airfoil. However, the repair of the airfoils and/or platforms is complicated due to its configuration as these components remain attached to each other in the assembly. Therefore, accessibility to areas requiring repair is restricted.

SUMMARY OF THE INVENTION

It is a principal object of the present invention to provide an improved method and apparatus for repairing a gas turbine engine vane assembly.

Another object is to provide a method and apparatus for separating the airfoil from the platform of a brazed vane assembly to enable the components to be repaired and subsequently reassembled.

Briefly, the present invention provides a process and apparatus for repairing a gas turbine engine brazed vane assembly by preheating the assembly to a temperature below the solidus of the base metal of the vane assembly and above the liquidus of the braze, then maintaining such temperature while separating the airfoil from the platform by pulling/pushing the airfoil and platform apart. Once separated, various repair operations can be carried out on the airfoil and/or platform followed by reassembly of the airfoil and platform into a brazed vane assembly.

The apparatus utilized to separate the platform from the airfoil includes: a heating means for preheating the assembly and a control system for maintaining the assembly at a predetermined temperature during the mechanical separation of the airfoil from the platform: a first fixture means to grip the inner platform and a second fixture means to grip the outer platform of the vane assembly; and a motion system for applying opposing motion and force to the first and second fixture means and the platforms gripped thereby to separate the airfoil from the platform.

DETAILED DESCRIPTION OF THE INVENTION

Figure 3:
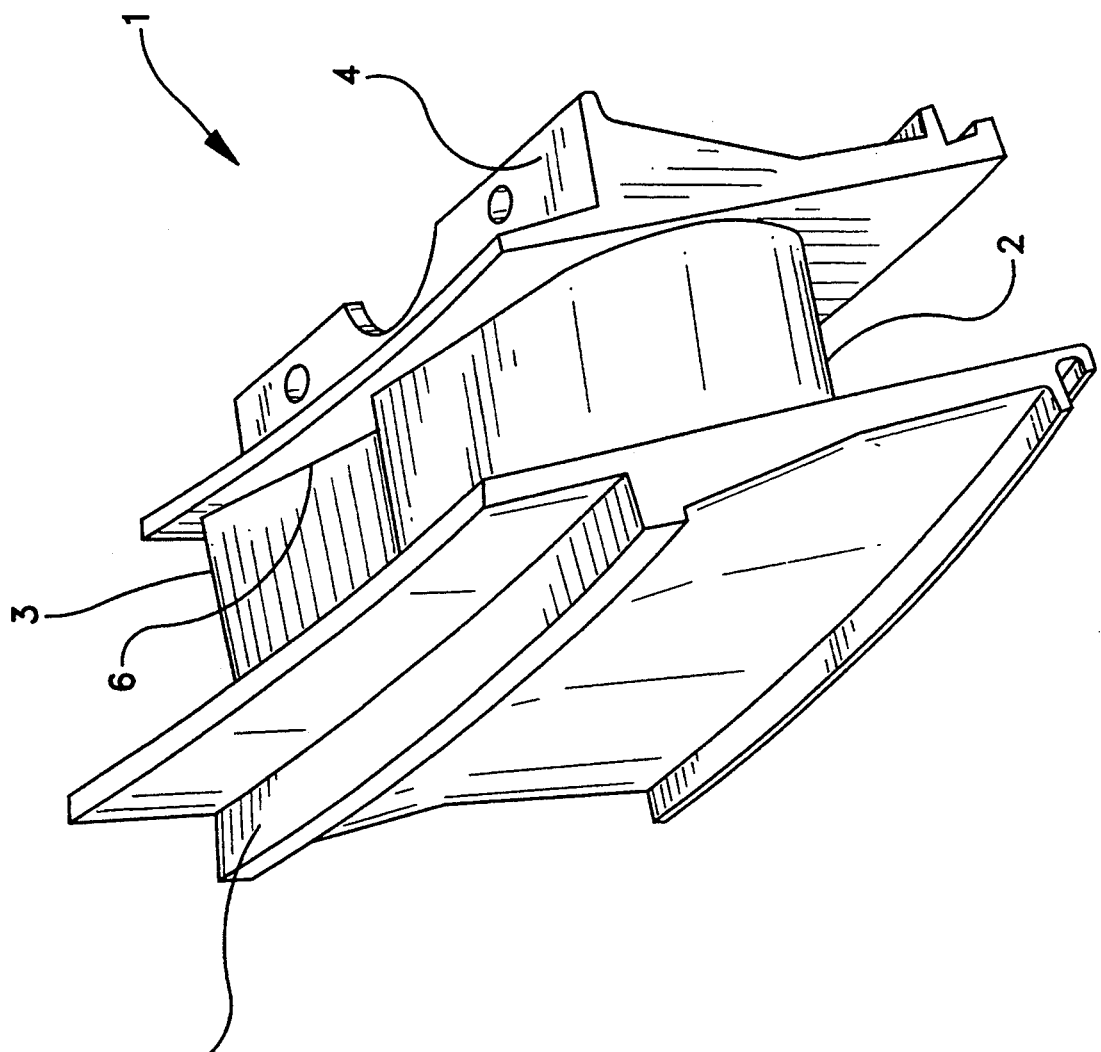
FIG. 3 is a perspective view of a typical brazed vane assembly with two airfoils.

The present invention relates to a process and apparatus for separating the components of a brazed vane assembly, specifically for separating a family of high pressure turbine vanes that are manufactured by brazing one or more airfoils into inner and outer platforms (see FIG. 3). Previous to this invention, this configuration of parts was considered to be an inseparable assembly and repaired as a single assembly making the repair more difficult and sometimes impractical to carry out and meet original component design requirements. As shown in FIG. 3, the brazed vane assembly 1 comprises paired airfoils 2 and 3 having a lead airfoil 2 and a trail airfoil 3 and an inner platform 4 and outer platform 5. The airfoils 2 and 3 are attached to the platforms 4 and 5 by brazed joints 6. While the vane assembly can comprise any number of airfoils, paired airfoils as illustrated are commonly employed.

Because of the adverse operating condition that these vane assemblies experience in service, the repair process involves advanced processes requiring accessibility to restore the airfoils and platforms to their original configuration by repairing cooling holes, stress cracks and burning, surface contour, nozzle area restoration and dimensional requirements critical to the function of the vane assembly in a gas turbine engine. By removing the airfoils from the platforms, a full restoration of the components can be achieved. Therefore original component design standards can be achieved, thus yielding a higher quality product meeting original engineering mechanical requirements.

Separation and removal of the airfoils from the platforms is accomplished by pre-heating the component to a temperature below the solidus of the base metal of the vane assembly and above the liquidus of the braze. The assembly is typically pre-heated and maintained at a temperature in the range of 1800° F. to 2250° F., preferably about 2200° F. The base metal of the vane assembly is generally comprised of nickel or cobalt base alloys such as Rene 142, N5, Mar M509 or X-40 which have a solidus in the range of 2250° F. to 2500° F. Enclosed Table I shows the composition of applicable alloys. During preheating and separation the temperature is maintained below the solidus of the base metal of the vane assembly in order not to adversely affect the properties of the base metal and to avoid degradation and distortion.

During preheating and separation the temperature is maintained above the liquidus of the braze in order to soften the braze to facilitate the separation of the airfoil from the platform. Typical brazes utilized in brazed vane assemblies are generally comprised of nickel or cobalt base alloy and include General Electric braze alloys, B-93 and B-28. Enclosed Table II shows the composition of these brazes and their liquidus.

The preheating step is carried out for a sufficient period of time to obtain uniform heating of the vane assembly at the desired temperature. Temperature ramping of the assembly is controlled to maximize energy efficiency during separation and to control base metal properties to prevent degradation and distortion. Typically, during preheating, soaking is carried out at the separation temperature for 10 to 15 minutes.

The separation of the components of the preheated brazed vane assembly is carried out by pulling/pushing the platform and airfoil apart while maintaining the preheated temperature. Separation is carried out in a single axis motion with an in line fixtured apparatus. The force required to pull the platform and vane apart is generally within the range of 2 to 20 psi, preferably 3 to 5 psi. In order to prevent oxidation or other degradation of the components, preferably the preheating and separation steps are carried out in an inert atmosphere, i.e. an inert gas such as argon, or under vacuum.

Figure 1:
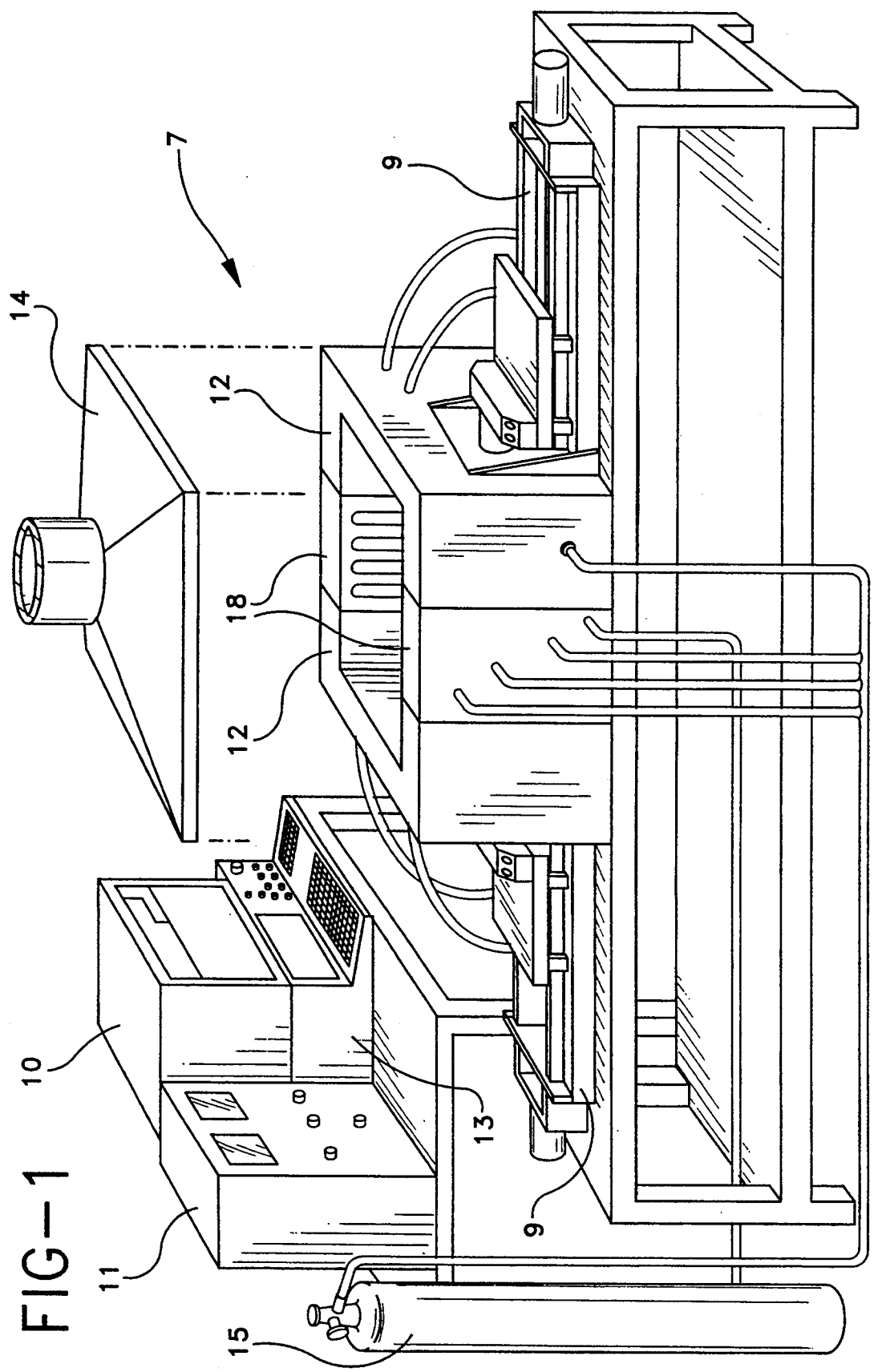
FIG. 1 is a perspective view of the apparatus utilized to separate the brazed vane assembly.

As shown in FIG. 1. the components of the apparatus 7 utilized to carry out the separation process includes a control system for the heater 8 and motion system 9 comprising a chart recorder 10, the power supply/heater controller 11 for the heater 8, a single axis motion system 9, that extends into chamber 12 and is controlled by the CNC controller 13. The chamber 12 has a cover 14 which is lowered to enclose and seal the chamber 12 to maintain the desired temperature and to allow for the supply of an inert gas 15 for an inert atmosphere within chamber 12 during the heating and separation steps.

Figure 2:
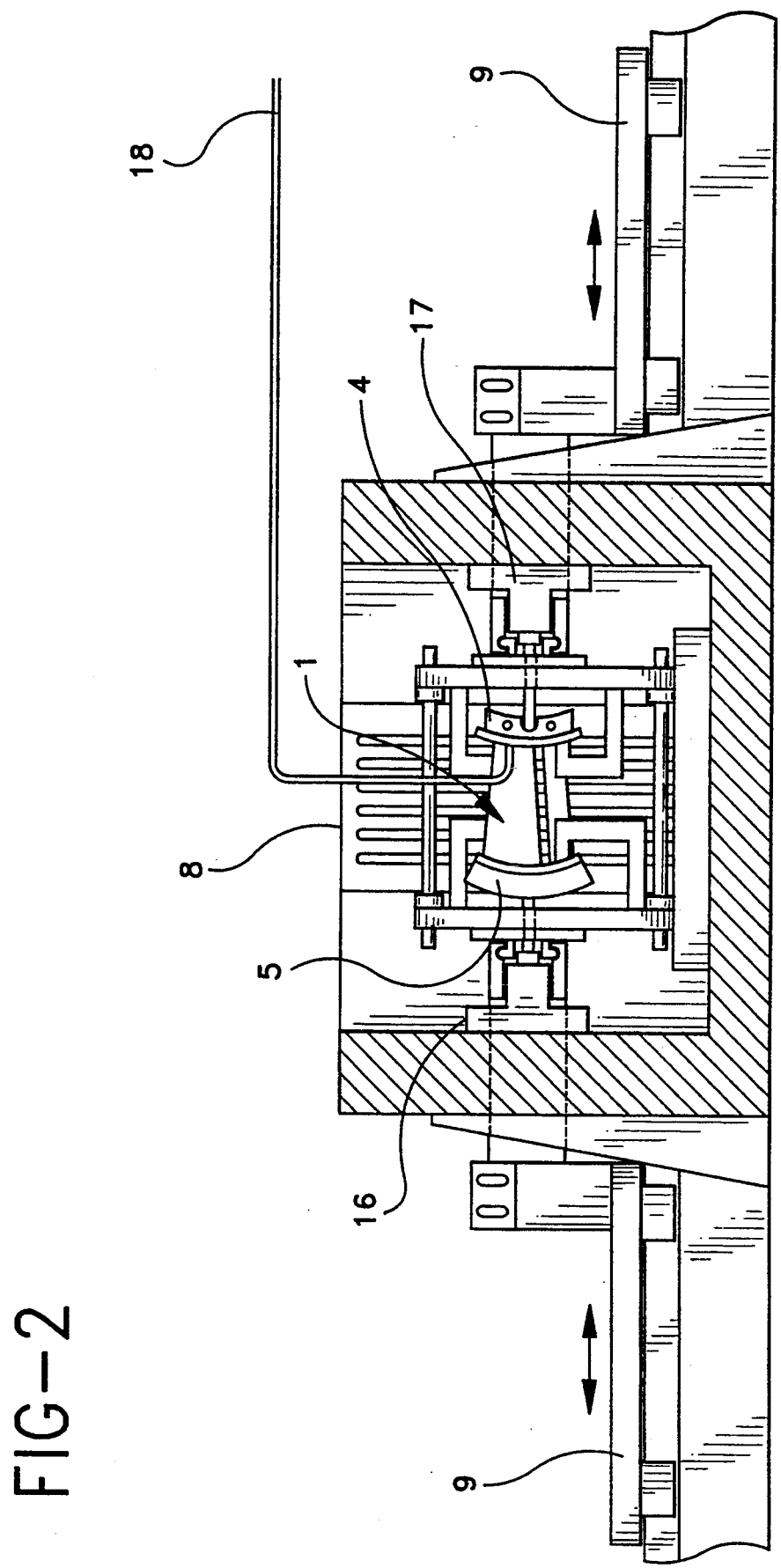
FIG. 2 is a cross sectional side view of the apparatus.
Figure 4:
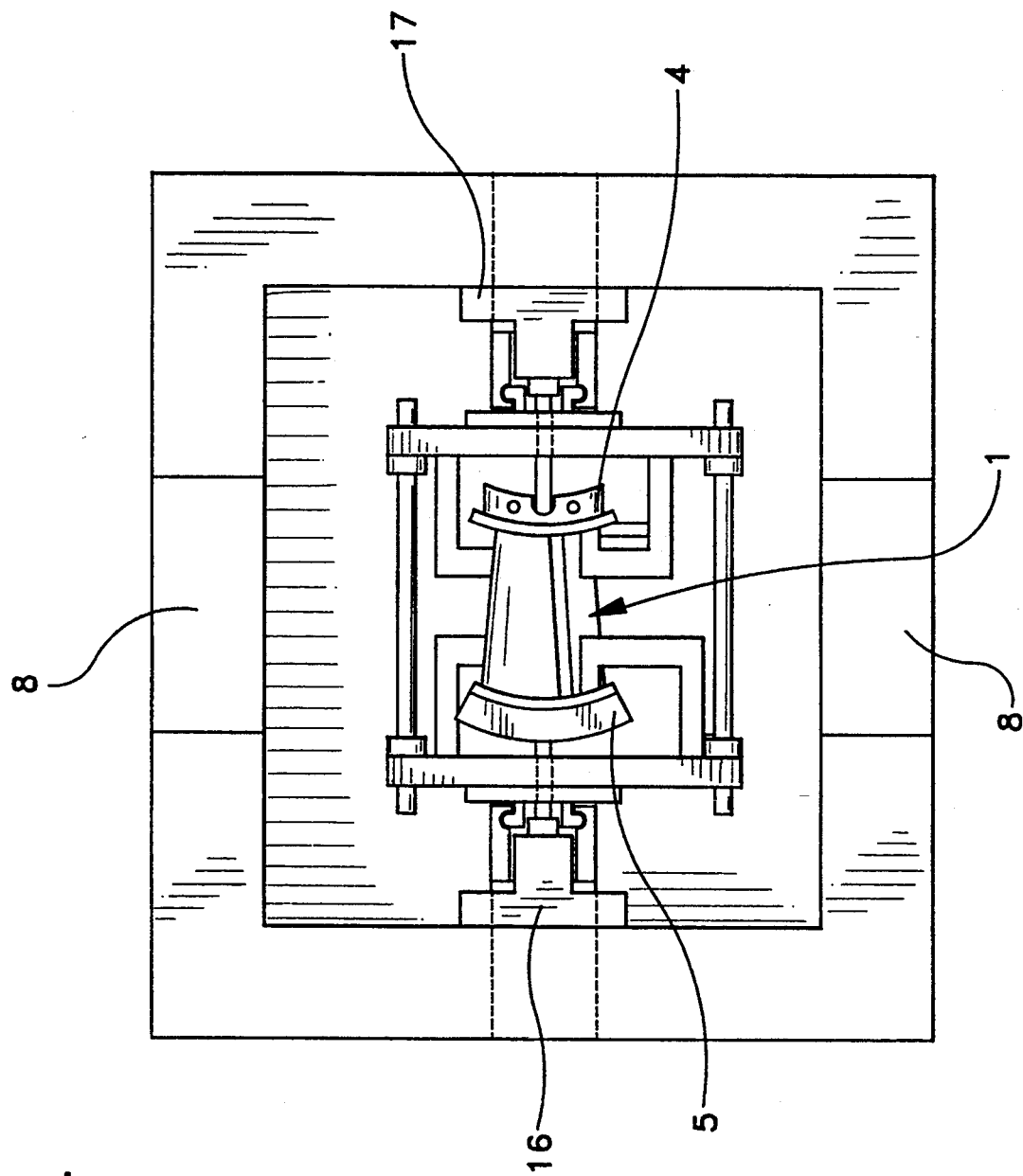
FIG. 4 is a top view of the heating chamber of the apparatus.

As shown in FIGS. 2 and 4, the vane assembly 1 is heated by the quartz lamp heater 8 and is held in a separation fixture 16 which grips outer platform 5 and separation fixture 17 which grips inner platform 4. The separation fixtures 16 and 17 are moved in opposite directions in a linear motion by the motion system 9 during the separation step. The heat input is monitored through the use of four thermocouples 18 and is controlled in a feedback loop from the heater controller 11 (shown in FIG. 1 ).

Once the vane assembly has been ramped and preheated to the desired temperature, the CNC controller starts a timer and holds the temperature for a specified time (soaking). The desired temperature is determined by the temperature of the original braze, its eutectic temperature and the base alloy material. The motion system is then activated and applies localized force to the gas path surface of the components (inside portion of the platform) and applies an opposing force to the airfoil to push the airfoil out, thus releasing the airfoil from the brazed cavity of the encapsulating platforms. During operation, the work area (the chamber retaining the assembly) is filled with an inert gas (e.g. argon) to minimize the oxidation rate of the alloy components while separation is taking place. In addition, the force of separation is controlled by a feedback loop that monitors the voltage in the drive motors of the motion system, therefore controlling the preset force parameters for the components being separated. By utilizing this control mechanism, undesired stress can be minimized or eliminated reducing any distortion or metal distress during the separation.

After the components of the vane assembly have been separated various repair operations can be carried out on the airfoil and/or platforms as individual units, followed by reassembly back to original manufactured condition. Repair operations which can be carried out on the separated components of the vane assembly include stripping coatings, brazing, welding or cladding damaged areas, applying protective coatings, thermal barrier coatings, hole drilling, precision machining, etc. The airfoil also can be repaired by removing the trailing edge, and replacing it with a new trailing edge manufactured from the same alloy and welded together by electron beam, TIG weld and joined by high temperature braze process and subsequently reassembled by re-brazing as an assembly. If a component, such as one of the airfoils is too badly damaged, then this component can be replaced by a new component, followed by re-brazing to an assembly meeting the original manufacturer's specifications.

This process enables repairs to be carried out efficiently and economically and even allows repairs that were not feasible due to the configuration of the vane assembly.

EXAMPLE

A CFM-56 turbine vane segment assembly of a configuration as pictured in FIG. 3 composed of a X-40 base metal and having a B-93 braze was placed in the apparatus depicted in FIGS. 1, 2 and 4. An argon gas was supplied to provide an inert atmosphere. The vane assembly was preheated to 2200° F. with a ramp up taking 15 minutes and held at this temperature for 10 minutes. While maintaining this temperature a force of 5 psi was applied by the motion system to separate the airfoils from the platforms.

The airfoils and platforms were then repaired by welding, benching, hole drilling, brazing, machining, hot forming and coating. After repair the components were reassembled and brazed utilizing a B-93 braze alloy.

TABLE I

| Designation | Nominal Composition of Nickel Or Cobalt Base Alloys | | | | | | | |
|---|---|---|---|---|---|---|---|---|
| | Al | C | Ni | Cr | Co | W | Ta | Ti | Other |
| Mar-M 509 | — | 0.60 | 10.0 | 23.5 | Bal | 7.0 | 3.5 | 2.00 | — | 0.05 Zr |
| X-40 | — | 0.50 | 10.5 | 25.5 | Bal | 7.5 | — | 0.00 | — | 0.75 Mn 0.75 Si |
| Rene 142 | 6.15 | 0.12 | Bal | 6.8 | 12.0 | 4.9 | 6.4 | 0.02 Max. | 1.50 Mo 1.50 Hf |

TABLE I-continued

| Designation | Nominal Composition of Nickel Or Cobalt Base Alloys | | | | | | | | |
|---|---|---|---|---|---|---|---|---|---|
| | Al | C | Ni | Cr | Co | W | Ta | Ti | Other |
| N5 | 6.20 | — | — | 7.0 | 7.5 | 5.0 | 6.5 | 0.02 Max. | 2.80 Re 1.50 Mo 0.15 Hf 3.00 Re |

TABLE II

| Designation | Nominal Composition of Brazes | | | | | | | | | Liquidus |
|---|---|---|---|---|---|---|---|---|---|---|
| | Al | C | Ni | Cr | Co | W | Ta | Ti | Other | |
| B50TF108 (B-93) | 3.0 | — | Bal | 14.0 | 9.5 | 4.0 | — | 4.90 | 4.00 Mo 0.70 B 4.55 Si | 2100° F. |
| B50TF90 (B-28) | 3.0 | 0.16 | Bal | 14.0 | 9.5 | 4.0 | — | 4.90 | 4.00 Mo 2.10 B 0.03 Zr 0.20 Max Mg 0.20 Max Si 0.30 Max Fe | @ 2120° F. |

What is claimed is:

1. A process for repairing a gas turbine engine brazed vane assembly having an airfoil attached by brazing to a platform comprising:
    preheating the brazed vane assembly to a temperature below the solidus of the base metal of the vane assembly and above the liquidus of the braze material;
    maintaining the temperature while separating the platform from the airfoil by pulling the platform and airfoil apart;
    followed by repairing or replacing the airfoil and/or platform; and
    then reassembling the vane assembly.

2. Process of claim 1 further comprising repairing the airfoil and/or platform then reassembling into a vane assembly.

3. Process of claim 2 wherein the preheating temperature is within the range of 1800° F. to 2250° F.

4. Process of claim 3 wherein the vane assembly has a lead airfoil, a trail airfoil, an inner platform and an outer platform.

5. Process of claim 4 wherein the separation is carried out under an inert atmosphere.

6. Process of claim 5 wherein the inert atmosphere is argon gas.

7. Process of claim 4 wherein the base metal of the platform and airfoil is a nickel or cobalt base alloy.

8. Process of claim 7 wherein the braze is a nickel or cobalt base alloy.

9. Process of claim 8 wherein the preheating temperature is about 2200° F.

10. Process of claim 4 wherein the force used to pull the airfoil and platform apart is within the range of 2 to 20 psi.

11. Process of claim 1 wherein a new component is substituted for either the airfoil or platform, followed by reassembling the vane assembly.

12. Process of claim 2 wherein the vane assembly is reassembled by re-brazing the airfoil and the platform together.

13. Process of claim 10 wherein the airfoil and platform are pulled apart by use of a single axis motion.

14. Process of claim 2 wherein the platform is separated from the airfoil by applying localized force to the inside portion of the platform and an opposing force to the airfoil to pull/push the airfoil out from the brazed cavity of the platform.

* * * * *